United States Patent
Giromini et al.

[19]

[11] Patent Number: 5,850,036
[45] Date of Patent: Dec. 15, 1998

[54] APPARATUS FOR LEAK TESTING VEHICLE WHEELS

[75] Inventors: Richard J. Giromini, Okemos; Mark R. Messman, Howell; Timothy M. Alteri, East Lansing, all of Mich.

[73] Assignee: Hayes Lemmerz International, Inc., Romulus, Mich.

[21] Appl. No.: 922,803

[22] Filed: Sep. 3, 1997

Related U.S. Application Data

[63] Continuation of Ser. No. 569,343, Dec. 8, 1995, abandoned.

[51] Int. Cl.$^6$ .................................................. G01M 3/20
[52] U.S. Cl. ........................... 73/40; 73/407; 73/45; 148/340
[58] Field of Search ............................... 73/40, 41, 40.7, 73/45, 45.1, 45.2, 49.6; 364/488, 478; 198/340, 349, 349.2; 209/546, 550, 600

[56] References Cited

U.S. PATENT DOCUMENTS

| | | | |
|---|---|---|---|
| 2,962,655 | 11/1960 | Wiley et al. | 73/41 X |
| 4,683,540 | 7/1987 | Kurosu et al. | 364/468 |
| 4,754,638 | 7/1988 | Brayman et al. | 73/40.7 |
| 4,813,268 | 3/1989 | Helvey | 73/40.7 |
| 4,852,390 | 8/1989 | Fisch | 73/40.5 A |
| 5,010,761 | 4/1991 | Cohen et al. | 73/40.7 |
| 5,018,381 | 5/1991 | Campos | 73/45.5 |
| 5,202,836 | 4/1993 | Iida et al. | 364/468 |

OTHER PUBLICATIONS

Varian Associates, Inc. "Introduction To Helium Mass Spectrometer Leak Detection", 1980.

*Primary Examiner*—Michael Brock
*Attorney, Agent, or Firm*—MacMillan, Sobanski and Todd, LLC

[57] ABSTRACT

An apparatus for checking leakage of a test gas through a wheel. The apparatus comprises wheel recognition apparatus for generating a first signal indicative of selected parameters of a wheel, a test cell for applying a differential pressure of a test gas through a selected portion of the wheel, and detecting apparatus for determining a leak rate of the test gas through the selected portion of the wheel. The detecting apparatus generates a second signal indicative of the leak rate. The apparatus of the invention also includes a microprocessor operatively connected to the recognition apparatus for receiving and processing the first signal to determine the model of the wheel from among a group of preselected model wheels. The apparatus is also operatively connected to the test cell for controlling operation of the detecting apparatus according to the model of the wheel, and operatively connected to the detecting apparatus for receiving and processing the second signal to generate a record of the leak rate. The invention also includes a method of manufacturing vehicle wheels wherein, after testing a wheel to determine a leak rate of a test gas through a selected portion of the wheel, the wheel is automatically permanently identified with that leak rate.

18 Claims, 4 Drawing Sheets

APPARATUS FOR LEAK TESTING VEHICLE WHEELS

This application is a continuation of Ser. No. 08/569,343, filed Dec. 8, 1995 now abandoned.

BACKGROUND OF THE INVENTION

This invention relates in general to leak detection devices, and more particularly to apparatus and method for quantifying the leak rate of a test gas through a vehicle wheel, permanently associating the wheel with the test results, and automatically directing subsequent handling of the wheel based on the detected leak rate.

Minute openings sometimes are present in the peripheral wall of automotive wheel rims after the wheels have been manufactured. These openings, while they may not be apparent to the naked eye, may nevertheless allow escape of air when the wheels are in service. "Tubeless" tires, which do not employ inner tubes, are widely used in modem vehicles. Tubeless tires utilize the peripheral wall of a wheel as a pressure boundary retaining air in the tire. Even minute openings, exposed to normal inflation pressures, can allow air to gradually leak of the tire, resulting in a flat tire which would need to be serviced.

Thus, it is important for manufacturers to test the wheels they produce to identify those wheels which leak more than a maximum acceptable leak rate, in order to repair the wheels if possible, and scrap the wheels if they cannot be repaired. It is also important in the production environment that tests be conducted quickly and reliably, and yet allow detection of even very minute leaks through the wheels.

Various methods of quickly detecting minute leakage of a test gas through a flawed component are known, including methods using a mass spectrometer device to quantify the leak rate of a test gas through components. Such methods are discussed in the book "Introduction to Helium Mass Spectrometer Leak Detection", copyright 1980 by Varian Associates, Inc., which is hereby incorporated by reference. Chapter 7 of this book deals with using helium mass spectrometers for leak detection, and describes leak testing of various types of automotive parts (other than wheels). The book describe a leak check operation for an air-conditioning throttle body. An operator places the component into the test cell 30 which is evacuated to less that 1 millimeter of mercury while a test gas of an air-helium mixture is applied at about 250 p.s.i. to the interior of the component. Gross leakage is identified by the absence of a sufficient vacuum in the chamber after a period of time. The mass spectrometer detects smaller leaks. A green light is lit to indicate that the component passes the leak test, while a red light is lit to indicate that the component has a leakage above an acceptable amount. Thus the helium mass spectrometer leak detection system described did not rely on the subjective judgment or interpretation by an operator, as are required in many other known methods of leak detection.

SUMMARY OF THE INVENTION

This invention relates to a method and apparatus for checking leakage of a test gas through a wheel.

The apparatus of this invention comprises a wheel recognition apparatus for generating a first signal indicative of selected parameters of a wheel, a test cell for applying a differential pressure of a test gas through a selected portion of the wheel, and detecting apparatus for determining a leak rate of the test gas through the selected portion of the wheel. The detecting apparatus generates a second signal indicative of the leak rate. The apparatus of the invention also includes a microprocessor operatively connected to the recognition apparatus for receiving and processing the first signal to determine the model of the wheel from among a group of preselected model wheels. The apparatus is also operatively connected to the test cell for controlling operation of the detecting apparatus according to the model of the wheel, and operatively connected to the detecting apparatus for receiving and processing the second signal to generate a record of the leak rate.

The invention also includes a method of manufacturing vehicle wheels wherein, after testing a wheel to determine a leak rate of a test gas through a selected portion of the wheel, the wheel is automatically permanently identified with that leak rate.

The pass/fail test of the prior art is adequate to detect faulty components. However, according to the invention, a precise quantification of the leak rates of the tested components has been determined to be useful in statistical monitoring of the process of manufacturing wheels. According to the invention, it would be desirable to provide a machine which would automatically perform a statistical analysis of the quantified results of automatic leak rate testing of a plurality of is wheels. These quantified results include not only how many wheels passed or failed a test of whether the detected leak rate was in excess of a chosen rate, but also will preferably include the actual leak rates of the tested wheels. Furthermore, it has also been found that would also be desirable to serialize the tested wheels, in order that, for example, any future failures can be correlated to a particular production run of the wheels. Furthermore, it may be desirable to provide a leak detection system with the capability of having the leak detection system automatically run a self-calibration function.

Analysis of wheels with leaks returned from customers shows that a large majority of such wheels were marked as having leaks during leak tests performed at the factory, but through operator error (such as being placed on the wrong pallet at the factory), the wheels were nevertheless distributed to customers. Accordingly, it would be desirable to provide an apparatus which would automatically test wheels for leaks, and automatically segregate wheels which fail a leak test from those which pass the leak test.

DETAILED DESCRIPTION OF THE INVENTION

Figure 1:
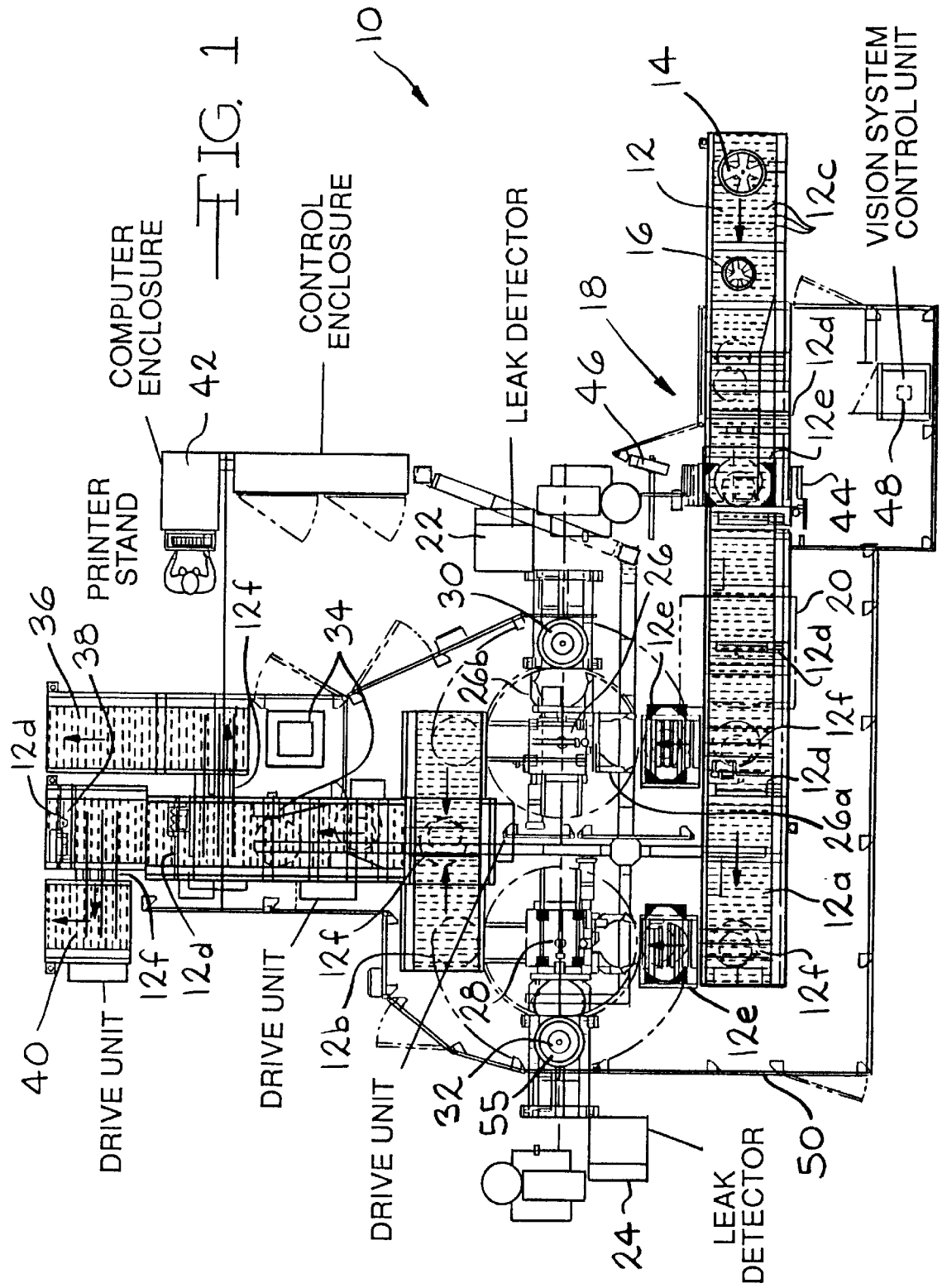
FIG. 1 is a plan view of the wheel leak detecting apparatus of this invention.

This invention relates to a method and apparatus for checking leakage of a test gas through a wheel. Referring to FIG. 1, the apparatus, indicated generally at 10, will preferably include a conveyor system 12 for automatically moving the wheels to be tested, 14 and 16, through the various stations of the apparatus 10. As will be further explained below, the apparatus 10 includes recognition apparatus, such as a vision system 18, to determine the type of wheel to be tested.

Figure 2:
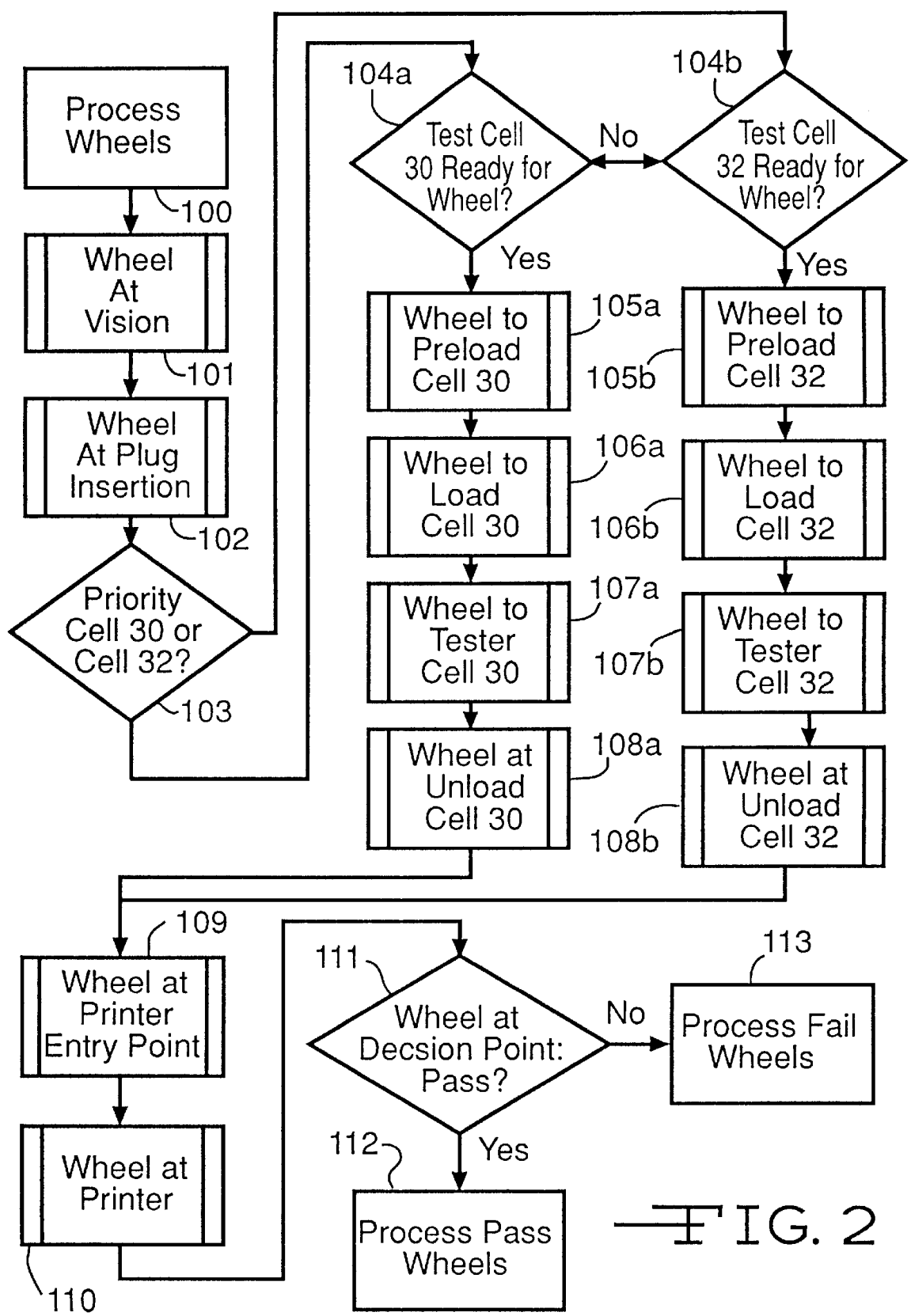
FIG. 2 is a flowchart illustrating the process that the computer controlling the apparatus illustrated in FIG. 1 can use to process a wheel therethrough.

FIG. 2 is a flowchart illustrating the process that can be used to process a wheel through the apparatus 10. Referring to both FIGS. 1 and 2, the process 100 of testing the wheels 14 and 16 begins, at step 101, with viewing the wheel with the vision system 18 to recognize what type of wheel is being tested.

A plug inserting system 20 may be provided for automatically temporarily plugging intentional openings such as a valve stem hole (not shown) in the wheel to be tested. This step is shown in FIG. 2 as a step 102.

Next, the wheel is conveyed to a mass spectrometer leak detecting system. The illustrated embodiment has two mass spectrometer leak detectors, indicated generally at 22 and 24, and the wheel to be tested can be conveyed to either one. Robotic pick-and-place machines 26 and 28 are provided for removing the wheel to be tested from the in-feeding portion 12a of the conveyor 12, moving the wheel to be tested to the associated test cell 30 or 32 of the associated mass spectrometer leak detector 22 or 24. After leak testing of the wheel is complete, the pick-and-place machine 26 or 28 will remove the wheel from the associated test cell 30 or 32, and place the wheel on an out-feeding portion 12b of the conveyor 12.

The wheel 14 or 16 is then moved past a printer 34, which sprays information on the wheel such as a serial number or the leak rate detected through the wheel. The wheel 14 or 16 is then conveyed to one of a plurality of discharge paths 36, 38, or 40 of the out-feeding portion 12b of the conveyor system 12, depending upon, for example, the results of the leak rate test, and the type of wheel 14 or 16 being tested.

Figure 3:
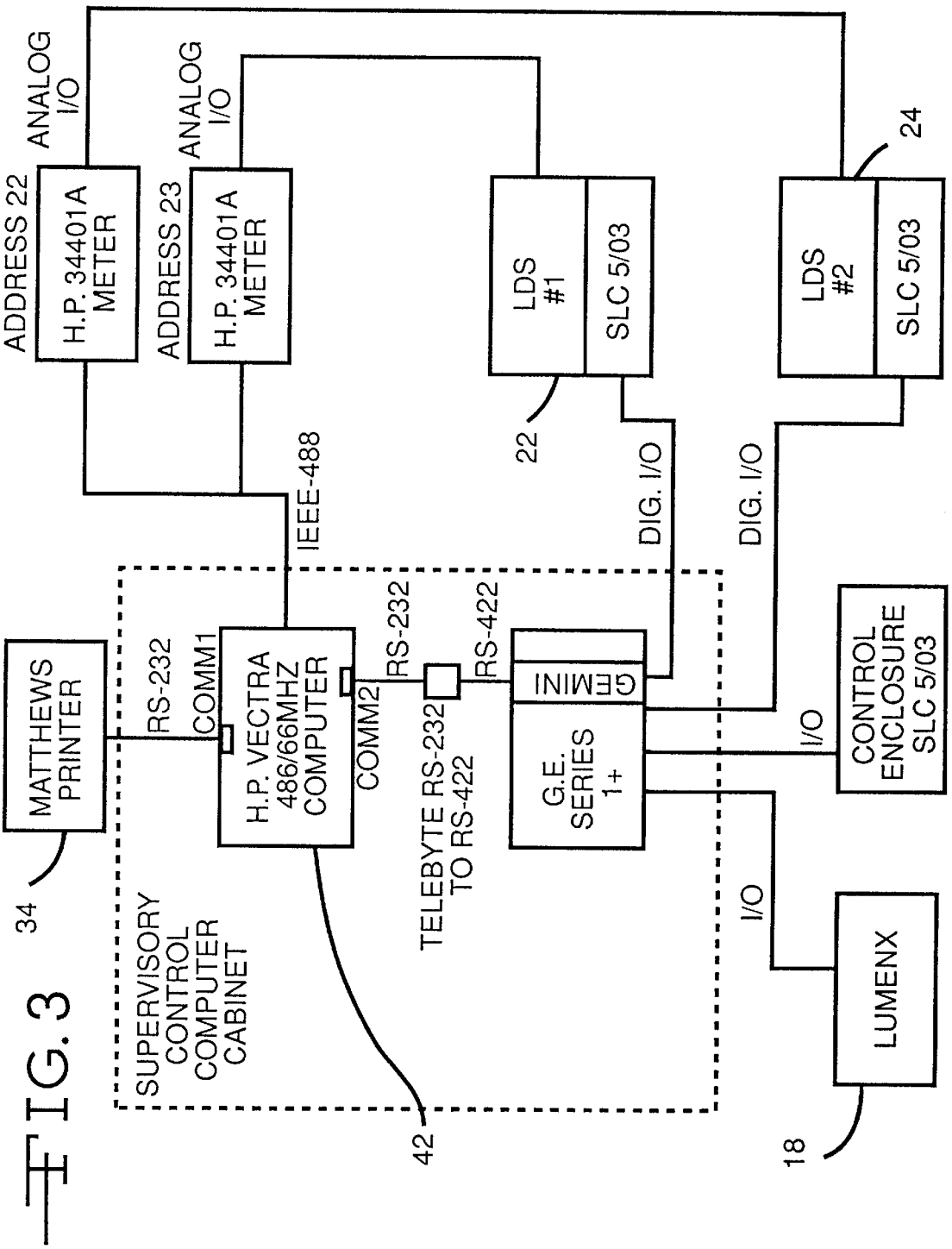
FIG. 3 is a schematic one-line diagram illustrating the lines of communication and control among various components of the detecting apparatus illustrated in FIG. 1.

A computer 42 controls the operation of the apparatus 10, and may be controlled by a program whose flowchart is at least in part shown in FIG. 2. FIG. 3 is a diagram of a typical control system configuration of the apparatus 10 (interconnection and control of the plug insertion system 20 is not shown). The computer 42 controls the operation of the conveyor system 12, receives input from the vision system 18 to identify the type of wheel being tested, controls the operation of the plug insertion system 20, if provided, the pick-and-place machines 26 and 28, the operation of the mass spectrometer leak detecting systems 22 and 24, and the printer 34. The computer 42 evaluates the results of the leak detection tests performed by the mass spectrometer leak detectors 22 and 24, and causes the results to be permanently stored, that is, stored in a permanent format, such as magnetic storage media, paper printout, or as printing on the wheel which was tested. In any case, the results of the test are permanently associated with the tested wheel, because the results are either printed directly on the wheel, or are stored along with a unique identification of the particular wheel tested, such as a serial number printed on the wheel by the printer 34.

Referring again to FIG. 1, it can be seen that the wheels 14 and 16 are of different sizes. As will be explained below, the apparatus 10 recognizes the various sizes of wheels 14 and 16, and takes the different sizes and styles of wheels into account when automatically leak testing the wheels 14 and 16. For simplicity of discussion, the operation of the apparatus 10 will only be discussed with respect to the wheel 14, unless otherwise noted, as the operation of the apparatus 10 is similar for each type of wheel. Similarly, only the mass spectrometer leak detector 22, the test cell 30, and the associated pick-and-place machine 26 will be discussed, as these components are similar to the mass spectrometer leak detector 24, the test cell 32, and the pick-and-place machine 28, respectively.

The conveyor system 12 includes conventional motorized rollers 12c, various gates 12d and clamps 12e for stopping and positioning the wheel 14 at key points along its path, and selectively vertically movable conveyor bands 12f interposed between the rollers 12c at several locations which operate to lift the wheel 14 off of the rollers and move the wheel 14 at right angles to its previous path.

Referring again to the vision system 18, it can be seen that the vision system 18 includes a light array 44 for illuminating the wheel 14, and a camera 46 which is operatively connected to a control unit 48. The control unit 48 is operatively connected to the computer 42. During step 101, the vision system 18 generates a first signal indicative of selected parameters of the wheel 14, such as diameter and width. The computer 42 receives and processes the first signal to determine the model of the wheel from among a group of preselected model wheels. Of course, it is possible to use other types of recognition apparatus other than the vision system 18 to determine the characteristics of the wheel 14, such as an array of sensor switches. Such other types of recognition apparatus are within the scope of the invention.

At a step 103, the computer 42 determines which test cell 30 or 32 has priority for processing the next wheel 14. Such priority may be manually selected by the operator, for example, or based on which of the test cells 30 or 32 a wheel 14 was last directed to, in order to ensure both test cells 30 and 32 are fully utilized to the extent possible. After the step 103, the logic of the computer program follows one of two paths depending upon which of the test cells 30 or 32 has priority. If the test cell 30 has priority, the computer 42 checks in a step 104a whether the test cell 30 is ready for a wheel 14. If the test cell 30 is not ready for a wheel 14, the computer 42 checks in a step 104b whether the test cell 32 is ready for a wheel 14. The computer 42 continues steps 104a and 104b until one of the test cells 30 and 32 is ready for a wheel 14. As indicated in FIG. 2, the determination of which of the steps 104a and 104b is performed after the step 103 is determined by which of the test cells 30 and 32 is determined in step 103 to have priority.

Assuming the test cell 30 has priority and is ready for a wheel 14, a gate 12d is raised on the conveyor system 12 to stop the wheel 14 above the conveyor band 12f for feeding the wheels 14 to the test cell 30. In a step 105a, the wheel 14 is detected to be at that preload station. After the wheel 14 is detected at preload, the conveyor band 12f is raised and operated to direct the wheel 14 to a clamp 12e at the load station for the test cell 30. The wheel 14 is detected at the clamp load station in a step 106a, and the clamp 12e is operated to center the wheel 14 at the load station for the test cell 30 so that the wheel 14 can be picked up by the pick-and-place machine 26.

The pick-and-place machine 26 has two pairs of robotic jaws 26a and 26b extending at right angles to one another. The pair of jaws 26a lifts the wheel 14 off the conveyor system 12 and, after the pick-and-place machine 26 has rotated 90 degrees counter-clockwise (as viewed in FIG. 1) places the wheel 14 in the cell 30 for leak testing.

During step 107a, the wheel 14 is placed in the test cell 30 for leak testing, as will be described below. During the leak testing, the pick-and-place machine 26 rotates clockwise to position the jaws 26a to pick up the next wheel to be tested, and positioning the jaws 26b next to the cell 30. Following the completion of the leak test of the wheel 14, the jaws 26b remove the wheel 14 from the test cell 30, and, after the pick-and-place machine 26 rotates counterclockwise to place the next wheel in the test cell 30, places the wheel 14 on the out-feeding portion 12b of the conveyor system 12. Note that for safety, a fence 50 is erected around the robotic pick-and-place machines 26 and 28.

Figure 4:
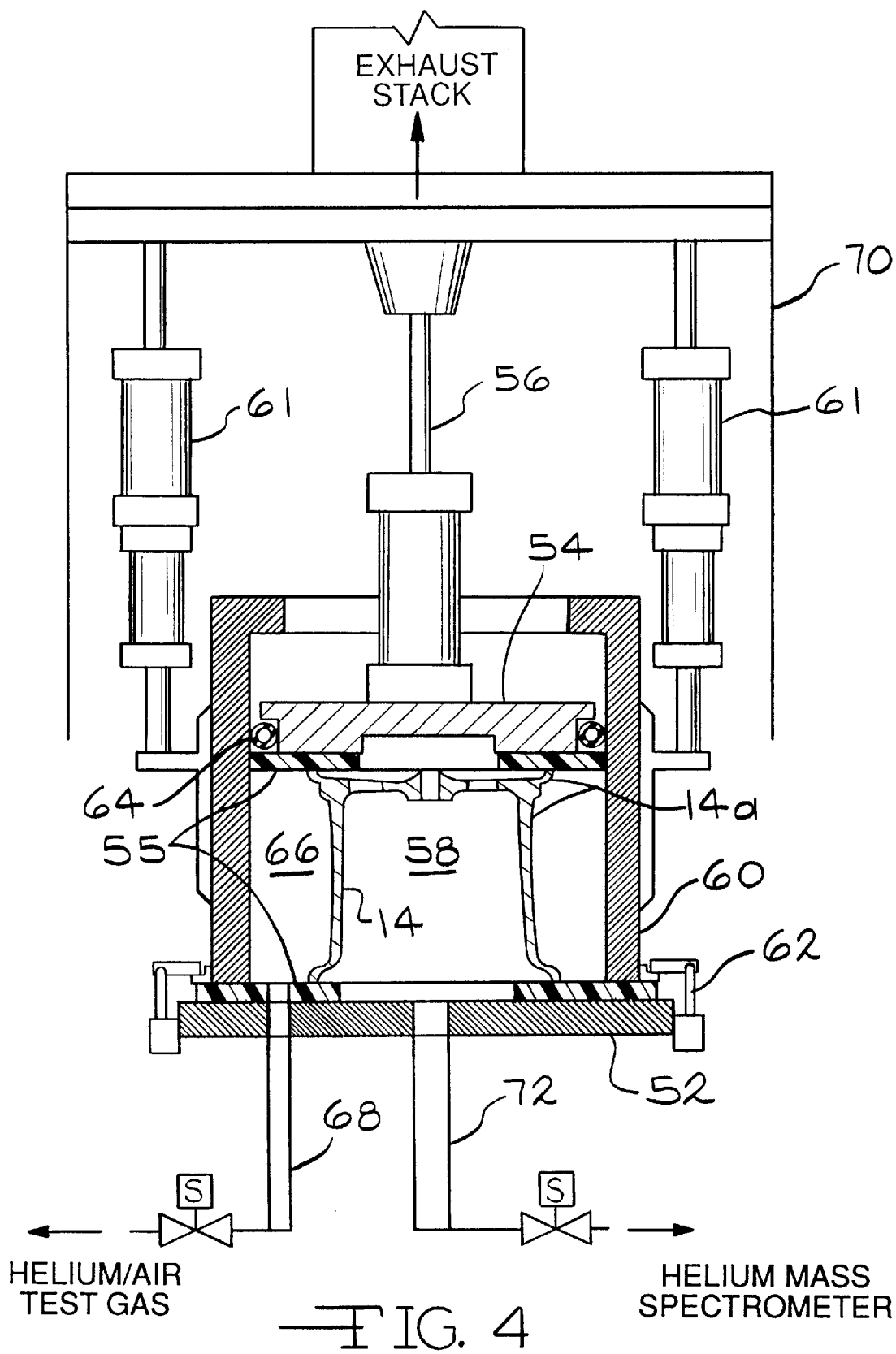
FIG. 4 is a diagrammatic elevational view of one of the leakage test cells illustrated in FIG. 1.

As shown diagrammatically in FIG. 4, the test cell 30 has a stationary flat lower plate 52 on which the wheel 14 is placed flat on either the inner or outer rim for testing. The test cell 30 also has a selectively movable flat upper plate 54 which can be lowered onto the wheel 14 by a hydraulic operator 56 to seal against the other rim of the wheel, so that the peripheral wall portion 14a of the wheel 14 cooperates with the flat plates 52 and 54 to enclose an inner chamber 58. The flat lower and upper plates 52 and 54 are provided with annular gaskets 55 to ensure a leak-tight seal with the rims of the wheel 14. The test cell 30 also includes a bell portion 60 which is selectively raised and lowered by a pair of hydraulic operators 61. The bell portion 60 has a open lower end with a rim which seals against the flat lower plate 52 when the bell portion 60 is in a lowered position, thereby enclosing the wheel 14 and the flat upper plate 54 within the bell portion 60. Automatic clamps 62 lock the bell portion 60 in this lowered, sealing position during the test cycle. With the flat upper plate 54 and the bell portion 60 in their lowered positions, a seal 64 disposed about the radially outer peripheral surface of the flat upper plate 54 is inflated to seal the flat upper plate 54 against the inner surface of the bell portion 60. The inflatable seal 64 enables the flat upper plate 54 and the bell portion 60 to seal together regardless of the width of a particular wheel 14 and resultant differing fully lowered positions of the flat upper plate 54. Thus the flat upper plate 54 and the bell portion 60, together with the outer surface of the wheel 14 and the flat lower plate 52 enclose an outer chamber 66. The outer chamber 66 is connected to a source of a helium/air test gas by a pipe 68. The test cell 30 has a hood 70 above it which is connected to an exhaust fan (not shown) in an exhaust stack. The fan rapidly removes from the area any traces of the helium/air mixture released when the bell portion 60 is opened.

During leak testing, the test cell 30 applies a differential pressure of the helium/air test gas across the peripheral wall of the wheel 14 by injecting the helium/air test gas in the chamber 66. The chamber 66 is typically pressurized to about 32 p.s.i.. Simultaneously a pump associated with the mass spectrometer leak detector 22 draws a vacuum in the inner chamber 58 through the line 72. If a preset amount of vacuum is not found within the chamber 58 within a preset time limit, this is an indication of a gross leak in the wheel 14, and the computer signals that the wheel is rejected.

After sufficient vacuum is reached in the inner chamber 58, the mass spectrometer leak detector 22 is energized to determine a leak rate of the test gas from the chamber 66 through the wheel 14 to the chamber 58. The mass spectrometer leak detector 22 generates a second signal to the computer 42 indicative of the measured leak rate. After the leak rate is determined, the flat upper plate 54 and the bell portion 60 are raised by the operators 56 and 61, respectively. In a step 108a, the wheel 14 is transported to the unload station for the test cell 30 on the out-feeding portion 12b of the conveyer system 12 by the pick-and-place machine 26.

As indicated above, the operation of the test cell 32 is substantially the same as the operation of the test cell 30. If the test cell 32 has priority and is available, the wheel 14 will be directed in a step 105b to the preload station for the test cell 32, at the end of the infeeding portion 12a of the conveyor 12, above a conveyor band 12f In a step 106b, similar to the step 106a, the wheel 14 is moved to the load station of the test cell 32. In a step 107b, similar to the step 107a, the wheel 14 is moved to the lower plate 52 of the test cell 32. In a step 108b, similar to the step 108a, the wheel 14 is moved to the unload station of the test cell 32.

Note that the computer 42 is operatively connected to the test cells 30 and 32 for controlling operation of the apparatus 10 according to the model of the wheel 14 detected by the vision system 18. If the wheel 14 is a relatively large wheel, then the chamber 58 will be relatively large, and it will take a relatively long time for the vacuum to fall to the desired level. Thus the computer adjusts the time allowed for drawing the vacuum in the chamber 58 according to the model of wheel 14 detected. Similarly, the size of the chamber 66 will vary with the size of the wheel 14, requiring a different size charge of helium/air mixture to be supplied to the test cell 30 or 32. Thus it can be seen that the novel use of the vision system 18 with the mass spectrometer leak detector 22 permits a variety of different wheels to be intermixed and leak tested by the apparatus 10.

The computer 42 is operatively connected to the mass spectrometer leak detector 22 for receiving and processing the second signal to generate a record of the leak rate of the tested wheel 14. Thus valuable data for Statistical Process Control (SPC) is accumulated by the computer 42 indicating not only whether a wheel 14 passed or failed the leak rate test, but also by how much. This data collection allows statistical analyses such as average and mode to be calculated for a given group of wheels, whether they be wheels produced during a certain period of time or for comparing the leak rates of different models of wheels. This data also allows one to determine whether wheels which fail the leak test are part of a group of wheels which all have leak rates close to the unacceptable limit, or are random outliners of a group of wheels mostly having leak rates much less than allowed.

The wheel 14 is moved by the conveyor 12 to the entry point of the printer 34 in a step 109. Operation of the conveyor 12 during the step 109 is under computer control in order to keep track of the order of the wheels 14 coming out of the test cells 30 and 32. The wheel 14 is then moved past a couple of generally triangular positioning bumpers which operate to position the wheel 14 adjacent the printer 34.

The leak rate and/or a serial number is preferably permanently recorded on the wheel 14 by the printer 34, which is an ink jet printer, as the wheel 14 passes by on the conveyor system 12, during a step 110. In a step 111, the computer 42 decides whether the wheel 14 at the printer passed the leak test. According to one preferred scheme, if the computer 42 determines the wheel 14 passed the leak test, the wheel is subsequently processed in a step 112 by having the computer 42 assign a sequential serial number to each wheel passing the leak detection test. Each type of wheel may have a respective series of serial numbers, such that no two wheels of the same type will be assigned the same serial number. This serial number is printed on the wheel 14, and is permanently recorded in a manner that the serial number can be cross-referenced to the record of the leak rate detected.

If the wheel 14 fails the leak test (i.e., has a leak rate greater than a predetermined maximum leak rate), the wheel is processed in a step 113 as a failed wheel. No serial number is assigned to the wheel 14, but the leak rate is printed on the wheel 14 to permanently associate the wheel 14 with the leak rate. Of course, other schemes for permanently associating the wheel 14 with the measured leak rate will be obvious to those of ordinary skill in the art in light of this disclosure, and are within the scope of this invention. For example, serial numbers and measured leak rates could be printed on all wheels regardless of whether or not they fail the leak test, or only serial numbers could be indicated on the wheels, with the serial numbers of the wheels and the associated measured leak rate permanently associated in computer memory or on a paper printout.

As part of the steps 112 and 113, the computer 42 preferably controls the subsequent movement of the wheel along the conveyor system 12 to separate leaking and non-leaking wheels 14. The computer 42 can also be programmed to transfer wheels of different sizes or models to different discharge paths 36, 38, or 40 of the out-feeding portion 12b of the conveyor system 12

It is contemplated that a self-calibration feature may be provided for the leak detection apparatus of this invention. One scheme of self calibration would entail inserting a calibrated leak fitting (not shown) into the valve hole of a special calibration wheel (also not shown). The calibrated leak fitting would be an orifice passing a known quantity of gas at a given differential pressure across the leak fitting. The calibration wheel would preferably be a steel wheel of a design which was different from any production design. The calibration wheel with the calibrated leak fitting in the valve stem hole is placed on the input conveyor 12 of the apparatus 10, and is conveyed to the vision system 18. The calibration wheel is programmed into the vision system computer, so that the vision system 18 will recognize the wheel as the calibration wheel. When the calibration wheel is recognized, the apparatus 10 goes into a self-calibration cycle.

The calibration wheel is transported to one of the test cells 30 and 32. The selection of which test cell is selected may be manually controlled by the operator, or may be automatically controlled by the computer 42, based upon, for example, which test cell was last calibrated. The actual leak value of the calibrated leak fitting is programmed into the computer 42, so that when the calibration wheel is subsequently leak tested in one of the test cells 30 or 32, the apparatus 10 compares the test reading to the programmed actual leak value. If there is a difference of greater than some predetermined value (for example, greater than 20%), the apparatus 10 repeatedly adjusts the mass spectrometer sensitivity and retests the calibration wheel until the test reading is within the predetermined value of the programmed actual leak value. Once the test reading is within the predetermined value of the programmed actual leak value, the apparatus 10 records in an electronic table the initial difference, the subsequent difference, and the value correction, along with the date and time. Next, the calibration wheel is transported to the discharge path 36, 38, or 40 to which rejected wheels are transported. The printer 34 does not print anything on the calibration wheel. The apparatus 10 then proceeds to the next regular cycle.

It is also contemplated that a piping connection (not shown) may be added to communicate through the bell 60 (either the lower or upper skirt portion of the bell 60, depending upon the test gas used). A pump (not shown) could be provided to pump the test gas/air mixture out of the chamber 66 at the completion of a leak test. After the pressure in the chamber 66 has been reduced to atmospheric pressure, the flat upper plate 54 and the bell portion 60 are raised, and the wheel 14 is transported to the out-feeding portion 12b of the conveyer system 12 by the pick-and-place machine 26.

The test gas/air mixture could be pumped into a storage tank (not shown) where the mixture would be stored before being re-injected into the chamber 66 for use in a subsequent test cycle. Additional test gas could be added to the mixture while the mixture is in the storage tank, or while the mixture is being re-injected into the chamber 66. Such an arrangement would advantageously maximize reuse of the test gas.

It is expected that with such an arrangement it may be necessary to adjust the length of time for injecting the mixture and additional test gas for the different volumes of the chamber 66 caused by the differences in the sizes of the wheels 14 and 16. Additionally, a sensor may be required to determine the concentration of the test gas in the mixture, to determine how much additional test gas is required to be injected to bring the mixture up to a nominal concentration of test gas in air, or to adjust the leak rate reading to account for variations in the concentration of test gas in air in the mixture being injected into the chamber 66.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A test cell for a mass spectrometer leak detection system, including:

a lower plate;

a upper plate selectively movable relative to said lower plate and adapted to cooperate with said lower plate and an object to be leak tested to define a first chamber, said upper plate having a radially outer surface;

a bell portion selectively movable relative to said lower plate and said upper plate, said bell portion having an opening into an interior thereof, said opening having a rim which may be sealed against said lower plate to enclose said upper plate and an object to be leak tested within said interior of said bell portion;

an inflatable seal disposed about said radially outer surface of said upper plate, which, when inflated, seals against said upper plate and said bell portion, and which in cooperation with said upper plate, said lower plate, said bell portion, and an object to be leak tested which is sealed against said upper and lower plates, defines an outer chamber around the object to be leak tested;

a source of a test gas selectively communicating with one of said inner and outer chambers; and a conduit adapted to provide selective communication between the other of said inner and outer chambers and a mass spectrometer leak detector.

2. A method of manufacturing vehicle wheels, comprising:

a) testing each wheel to quantify a leak rate of a test gas through a selected portion of the wheel; and b) permanently marking each wheel such that said quantified leak rate is permanently associated with the marked wheel.

3. The method of claim 2, wherein step b) includes permanently marking said quantified leak rate on each wheel.

4. The method of claim 2, wherein said permanent marking process of step b) is performed automatically by a printer.

5. The method of claim 2, wherein step b) includes the steps of:

b1) permanently marking the marked wheel with a unique identifying indicia; and b2) recording said quantified leak rate and said unique identifying indicia in a permanent record such that said unique identifying indicia is associated with said leak rate.

6. The method of claim 5, wherein said unique identifying indicia is a serial number.

7. The method of claim 2, further including after step b) the steps of:

c) recording said quantified leak rate in a record containing recorded quantified leak rates of other wheels; and d) statistically analyzing said quantified leak rates recorded in said record.

8. The method of claim 2, wherein step a) includes the steps of:

a1) utilizing a vision system to automatically determine what model each wheel is of a group of pre-selected wheel models;

a2) adjusting a testing cycle of a leak test apparatus in a predetermined manner according to the determined model of each wheel; and a3) testing each wheel in said testing apparatus to quantify said leak rate.

9. The method of claim 8, wherein in step a2) the amount of a test gas used to test each wheel is adjusted depending upon which model wheel of the group of pre-selected wheel models each wheel is determined to be.

10. An apparatus for checking leakage of a test gas through a wheel, comprising:

a vision system for generating a first signal indicative of selected parameters of the wheel;

a test cell for applying a differential pressure of a test gas through a selected portion of the wheel being checked;

detecting apparatus for quantitatively determining a leak rate of the test gas through said selected portion of the wheel being checked and generating a second signal indicative of said leak rate; and a microprocessor operatively connected to said vision system for receiving and processing said first signal to determine the model of the wheel being checked, and operatively connected to said test cell for controlling operation of said detecting apparatus according to the model of the wheel being checked, and operatively connected to said detecting apparatus for receiving and processing said second signal to generate a quantified permanent record of said leak rate.

11. The apparatus of claim 10, wherein said detecting apparatus includes a mass spectrometer, and wherein said test cell includes a pair of plates which sealingly engage the wheel being checked to defined an inner first chamber, a reciprocating container engaging one of said plates to defined an outer second chamber containing the wheel being checked, and wherein said test cell is adapted to receive a test gas introduced in one of said first and second chambers, the amount of the test gas to be introduced being dependent upon the recognized model of the wheel being checked, and wherein said mass spectrometer measures the amount of the test gas in a sample taken from the other of said first and second chambers to determine a leak rate of the test gas through the wheel.

12. The apparatus of claim 10 further including a marking apparatus operatively connected to said microprocessor for permanently marking each wheel being checked with indicia permitting an association of the wheel with said quantitatively determined leak rate.

13. The apparatus of claim 12, wherein said indicia is said quantitatively determined leak rate.

14. The apparatus of claim 12, wherein said indicia is a serial number, and further including an apparatus for producing a permanent record associating said indicia and said quantitatively determined leak rate.

15. The apparatus of claim 12, wherein said marking apparatus is a printer which prints said quantitatively determined leak rate on the wheel being checked if said quantitatively determined leak rate is at least a predetermined leak rate, and prints a unique serial number on the wheel being checked if said quantitatively determined leak rate is below said predetermined leak rate, and further including an apparatus for producing a permanent record associating said unique serial number and said quantitatively determined leak rate.

16. A method of manufacturing a vehicle wheel, comprising:

a) testing a wheel to quantify a leak rate of a test gas through a selected portion of the wheel; and b) permanently marking said wheel such with said quantified leak rate.

17. A method of manufacturing a vehicle wheel, comprising:

a) testing a wheel to quantify a leak rate of a test gas through a selected portion of the wheel; and b) permanently marking said wheel with a serial number; and c) recording said quantified leak rate and said serial number in a permanent record such that said quantified leak rate may be determined in the future by the steps of:

d) observing said serial number on said wheel; and e) reading the quantified leak rate associated with said serial number in said record.

18. A method of manufacturing a vehicle wheel, comprising:

a) testing a wheel to quantify a leak rate of a test gas through a selected portion of the wheel; and b) permanently marking said quantitatively determined leak rate on the wheel being checked if said quantitatively determined leak rate is at least a predetermined leak rate, and permanently marking a unique serial number on the wheel being checked if said quantitatively determined leak rate is below said predetermined leak rate and producing a permanent record associating said unique serial number and said quantitatively determined leak rate.

* * * * *